Patented Apr. 28, 1942

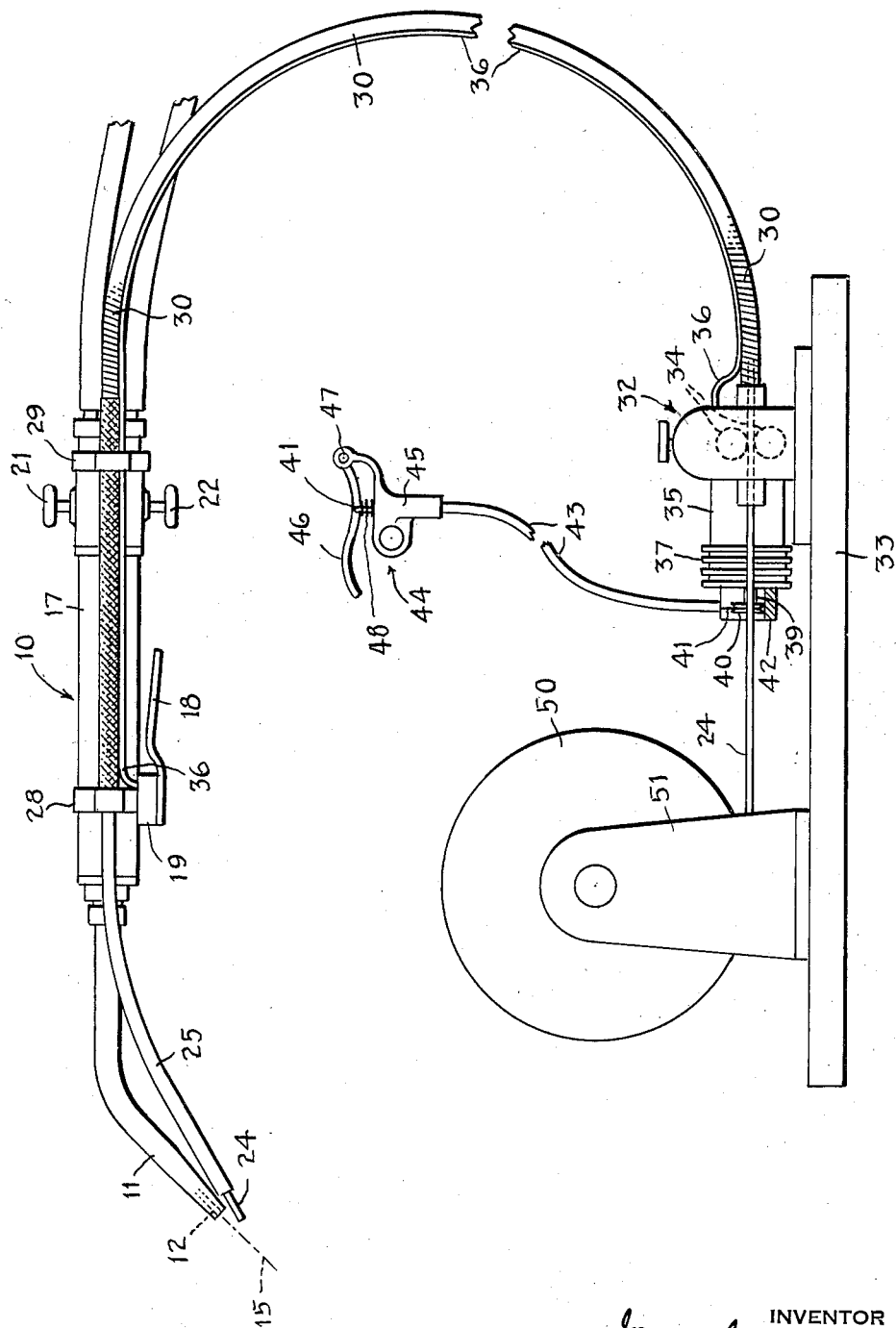

2,280,879

UNITED STATES PATENT OFFICE 2,280,879

WIRE FEED FOR HAND TORCHES

James L. Anderson, Closter, N. J., assignor to Air Reduction Company, Incorporated, New York, N. Y., a corporation of New York Application May 7, 1940, Serial No. 333,716

9 Claims. (Cl. 113—109)

This invention relates to apparatus for feeding wire into a weld when working with a hand welding torch.

When welding together metal parts that are separated by a cleft or that come together at the bottom of a groove or trough, additional metal, as from a welding rod, may be melted into the space between the parts in order to obtain a weld as thick or thicker than the connected sections.

A common method by which metal is added to a weld, when using a hand torch, is to move a welding rod along ahead of the torch with the lower end of the rod in such position that it is melted into the molten puddle which solidifies to make the weld.

When a welding rod becomes short it must be discarded. From 6 to 8 inches of each rod cannot be used. To avoid this loss, a coil of wire is sometimes used in place of a welding rod. The welder holds the coil in one hand with the end portion bent out straight so that it projects into the welding region in the same manner as a welding rod.

It is an object of this invention to provide mechanical apparatus for supplying welding wire to the weld made by a hand torch. In accordance with one feature of the invention, the welding wire may be fed into the weld either ahead of or behind the flame.

Another object of the invention is to provide apparatus for feeding welding wire continuously to the region of the flame of a hand welding torch, and the feed is preferably at a controlled rate of speed.

With the welding apparatus of this invention metal can be added during hand welding operations with greater convenience than formerly, but the more important advantage of the invention is that it increases the speed of welding. An outstanding saving in time is obtained by reason of the fact that the welding of long seams need not be interrupted to get a new welding rod or to unreel more wire from a coil held in the hand.

Other objects, features and advantages of the invention will appear or be pointed out as the specification proceeds.

The drawing shows a hand cutting torch with wire feed apparatus embodying the invention.

A hand welding torch 10 has a tip 11 with an orifice 12 from which a welding flame is projected in the direction of the axis 15 of the orifice. The torch 10 has a handle portion 17, and a lever 18 actuated by the same hand with which the operator grips the handle portion of the torch.

The lever 18 operates an electric switch 19 secured to the torch.

The supply of oxygen and fuel gas is controlled by valves located in the torch and actuated by handles 21 and 22. If the torch is equipped also with a quick-acting shut-off valve, such valve may be operated by the same lever that operates the electric switch 19, the switch being closed when the valve is opened, and vice versa.

A welding wire 24 is fed into the region just below the discharge end of the orifice 12. The welding wire passes through guide means that include a metal tube 25 that can be bent to change the angle and location of the guide means with respect to the tip 11 and to feed the welding wire into the flame from either ahead of or behind the tip. The end of the guide tube 25 from which the wire is discharged extends at an acute angle to the axis 15 of the tip.

The upper portion of the guide tube 25 is held by connectors 28 and 29 secured to the torch. A flexible conduit 30 is attached to the upper or inlet end of the guide tube 25. That part of the tube 25 that extends along the handle portion 17 of the torch is covered with heat insulating material so that heat conducted up the tube 25 from the region of the welding flame will not make the torch uncomfortable to hold.

The flexible wire conduit 30 guides the welding wire 24 as the wire passes from a wire-propelling apparatus 32 mounted on a base 33. The end of the flexible conduit 30 is connected with the apparatus 32, and welding wire 24 is pushed into the flexible conduit 30 by feed rolls 34 which are driven by an electric motor 35 through reduction gearing on the end of the motor.

An electrical conduit 36 extends from the switch 19 to the motor 35 and houses wires through which the switch controls the operation of the motor. The electrical conduit 36 extends along and is preferably connected to the wire conduit 30 throughout most of the length of the wire conduit.

The motor 35 is equipped with a centrifugal governor 37. The governor is adjustable to change the speed to which it holds the motor 35. The adjustment is made by rotating a shaft 39 in one direction to increase the motor speed and in the opposite direction to decrease it. A drum or grooved roller 40 secured to the end of the shaft 39 is turned by a control wire 41 that wraps around the roller 40 and has its end connected to the roller.

When the wire 41 is pulled, it unwinds from the roller 40 and in doing so turns the roller. The wire 41 is sufficiently stiff and is confined radially around the roller 40, by the housing 42 that surrounds the roller 40, so that when this wire is pushed it rotates the roller 40 and winds around the roller.

The control wire 41 extends through a flexible guide conduit 43, which is connected at one end to the housing 42. To the other end of the flexible guide conduit 43 there is attached a manual control assembly 44. This assembly includes a handle 45 that is shaped to be comfortably held by the operator in his free hand when holding the torch with his other hand. A lever 46 is connected at one end to a bracket portion of the handle 45 by a pivot 47 that serves as the fulcrum of the lever 46.

The upper end of the control wire 41 is connected to the lever 46. The lever 46 is urged away from the handle 45 by a spring 48 compressed between the lever and the handle 45. The operator grips the handle 45 and the lever in such a way that by tightening his grip he moves the lever 46 toward the handle 45 and pushes the control wire down. When the operator relaxes his grip on the lever 46 and handle 45, the spring 48 pushes the lever away from the handle and pulls the control wire. These movements of the control wire in opposite directions shift the governor adjustment to increase or decrease the motor speed depending upon the direction of movement.

The action of the operator in tightening his grasp upon the lever 46 and handle 45 can be made effective to either increase or decrease the rate of welding wire feed. In the preferred embodiment of the invention the tighter grip produces an increase in speed of the motor 35 and thereby increases the rate of feed of the welding wire.

It will be understood that the control assembly 44 and the apparatus through which it effects changes in the adjustment of the governor 37 are merely representatives of remote control means. It is not necessary that the control assembly 44 be manually operated. A pedal-actuated assembly can be used, but the illustrated control means has the distinct advantage that the operator has it in his hand as he moves along an extended weld. A foot-actuated control is not so easily moved.

The welding wire 24 is supplied from a reel 50 that is rotatably supported by a frame 51 extending up from the base 33. This reel may be of substantial size and weight since the base 33 on which it is supported need not be moved. The welding wire guiding conduit 30, the electrical conduit 36, and the control wire conduit 43 are made with sufficient length to permit the operator to move along the full length of the seam to be welded.

Changes and modifications can be made in the apparatus illustrated, and some features of the invention can be used without others.

I claim:

1. The combination with a hand welding torch having a handle portion and a tip extending at an angle to the handle portion of a guide for directing a welding wire into the region of a welding flame at the end of the tip, said guide including a flexible conduit leading to wire feeding mechanism remote from the torch, and means connecting the guide to the torch, said guide being movable to shift it into position to feed the wire into a weld on different sides of the welding flame.

2. The combination with a hand welding torch, of a flexible tube with one end connected to the welding torch, a stationary wire feed apparatus, including feed rollers supported independently of the torch, and associated with the other end of the flexible tube for pushing a welding wire through said tube, and remote control apparatus for controlling the operation of the stationary wire feed apparatus.

3. Welding apparatus including a hand welding torch which has a tip portion and a handle portion, means for feeding a welding wire into the weld adjacent the tip when the torch is in operation, said means including a wire guide terminating close to the end of the tip, and a section of tubing extending along the length of the handle and through which the wire passes, heat insulation over said section of tubing, and means for pushing welding wire through said tubing and guide, said means being located remote from the torch.

4. A wire feed device for a hand welding torch including guide means connected to the torch and disposed to direct a welding wire angularly of the torch tip into the region of the welding flame when the torch is in use, a flexible conduit comprising at least a portion of the guide means and connected at one end to the torch, wire feed mechanism connected with the other end of the flexible conduit for pushing the welding wire into and through said conduit, and remote control apparatus for the wire feed mechanism including an operator-actuated member separate from the torch but within the reach of the welder, said member being movable to keep it within the welder's reach when making a long weld.

5. The combination with a hand welding torch, of a flexible tube with one end connected to the welding torch, a stationary wire feed apparatus associated with the other end of the flexible tube for pushing a welding wire through said tube, said apparatus including an electric motor with a centrifugal governor having adjustment means for controlling the motor speed, and remote control apparatus comprising a wire connected at one end with the centrifugal governor, a flexible sheath enclosing the wire throughout most of the length of the wire, a lever at the end of the sheath remote from the governor and connected to the control wire to move said wire in a direction to increase the motor speed, and a spring for urging the control wire in a direction to decrease the motor speed.

6. The combination with a hand welding torch of guide means through which a welding wire is supplied to the region of the torch tip, mechanical apparatus for propelling a welding wire through said guide means, a speed control device movable progressively to change the speed of operation of the propelling apparatus, and operator-operated means for moving said speed control device.

7. The combination with a hand welding torch of guide means through which a welding wire is supplied to the region of the torch tip, mechanical apparatus for propelling a welding wire through said guide means, a speed control for the propelling apparatus, said control including a yieldable member that causes a change in the speed of the propelling apparatus when moved in the direction in which said member yields, and that causes an opposite change in speed while returning toward its original position.

8. Welding apparatus including a hand welding torch, motor-driven means for feeding a welding wire into the region of the flame of the torch, a governor for controlling the speed of operation of the feeding means, a governor adjustment, a spring urging the governor adjustment in one direction to change the motor speed, and a manual control assembly constructed and arranged to be held by the torch operator, said assembly including a lever that is pushed by the operator against the tension of said spring, and motion-transmitting means by which such movement of the lever changes the governor adjustment.

9. The combination with a hand welding torch of guide means through which a welding wire is supplied to the region of welding, wire feed apparatus for pushing the welding wire through the guide means, a motor for operating the wire feed apparatus, and speed control means for the motor including a remote control having an operator-operated part that can be moved by the operator from place to place as the weld progresses lengthwise along the work.

JAMES L. ANDERSON.